Jan. 14, 1969   B. C. PERKINS   3,421,494
ATMOSPHERIC HEATING SYSTEM
Filed Sept. 7, 1966   Sheet 1 of 2

INVENTOR
BERNARD C. PERKINS
BY
Semmes & Semmes
ATTORNEYS

Jan. 14, 1969  B. C. PERKINS  3,421,494
ATMOSPHERIC HEATING SYSTEM
Filed Sept. 7, 1966  Sheet 2 of 2

INVENTOR
BERNARD C. PERKINS
BY
Semmes & Semmes
ATTORNEYS

United States Patent Office 3,421,494
Patented Jan. 14, 1969

3,421,494
ATMOSPHERIC HEATING SYSTEM
Bernard C. Perkins, Winter Haven, Fla., assignor of one-sixth to F. D. Bowen, Winter Haven, Fla., one-sixth to Gilbert Bowen, Winter Haven, Fa., one-sixth to Winston F. Lawless, Lake Alfred, Fla., and one-sixth to Winger Enterprises, Inc., Sarasota, Fla., a corporation of Florida
Filed Sept. 7, 1966, Ser. No. 577,765
U.S. Cl. 126—59.5
Int. Cl. A01g 13/06; F23d 11/00
6 Claims

ABSTRACT OF THE DISCLOSURE

This concept relates to heating the atmosphere in orchards and ground crops against frost or freezing damage. One uses herein a combustible liquid transformed or converted to gas in a heating stack, the conduit for the fuel being heated to assist in a liquid-gas conversion. Novel nozzle means in the fuel conduit of the liquid-gas are incorporated in the system, said nozzle means being accurately controlled in output by the heat generated within the system.

---

In particular, it is directed to a heating stack generator discharge combination which provides maximum heating with minimum fuel. Further, this invention provides automatically adjustable temperature responsive structure to vary the fuel pattern and outflow to meet changing liquid-gas conversion temperature conditions.

Various types of agricultural heaters have been developed. These usually consist of dischargigng a pre-determined amount of fuel to a pipeline-nozzle combination, which is then ignited to throw off heat to the surrounding area. These, however, have not been completely effective, and present certain disadvantages. For example, if gasoline fuel products are used, water may be discharged and burned; this could create a great amount of smoke that would discolor and/or damage the crop.

Further, conventional systems have proven to be inefficient, in that a large amount of fuel is wasted and burned inefficiently causing air pollution. Still further, conventional heaters do not normally provide automatic temperature responsive means to vary the amount of fuel flow; nor is the fuel flow pattern designed to meet changing temperatures and fuel conditions.

This invention is designed to provide an efficient heater that may be powered by fuel oil or diesel fuel, for example. It provides optimum fuel-oxygen conditions to maximize B.t.u. output. Further, automatic means are provided to vary the amount of fuel discharged, as well as the pattern thereof, and to create burning conditions to minimize smoking and decrease air pollution.

It is therefore an object of invention to provide a heater using a fuel feed line generator and stack configuration to provide the maximum convection and radiation of heat per amount of fuel used.

It is another object of invention to provide a temperature responsive nozzle to be utilized in conjunction with the heater fuel feed line generator and stack configuration to maximize B.t.u. output.

It is another object of invention to provide a temperature responsive nozzle and heater stack configuration which permits a change in the amount and pattern of fuel discharged as the temperature of the fuel varies by generation, thereby adapting the combination to temperature conditions of the surrounding area.

It is another object of invention to provide a heater for use in minimizing the effects of frost and freezing to agricultural products which is automatically adjustable according to fuel temperature changes, efficient in B.t.u. output, and relatively inexpensive to maintain.

It is still another object of invention to provide an agricultural heater which maximizes B.t.u. output, minimizes smoking and air pollution.

These and other objects of invention will be apparent from the following specification and drawings in which.

Figure 1:
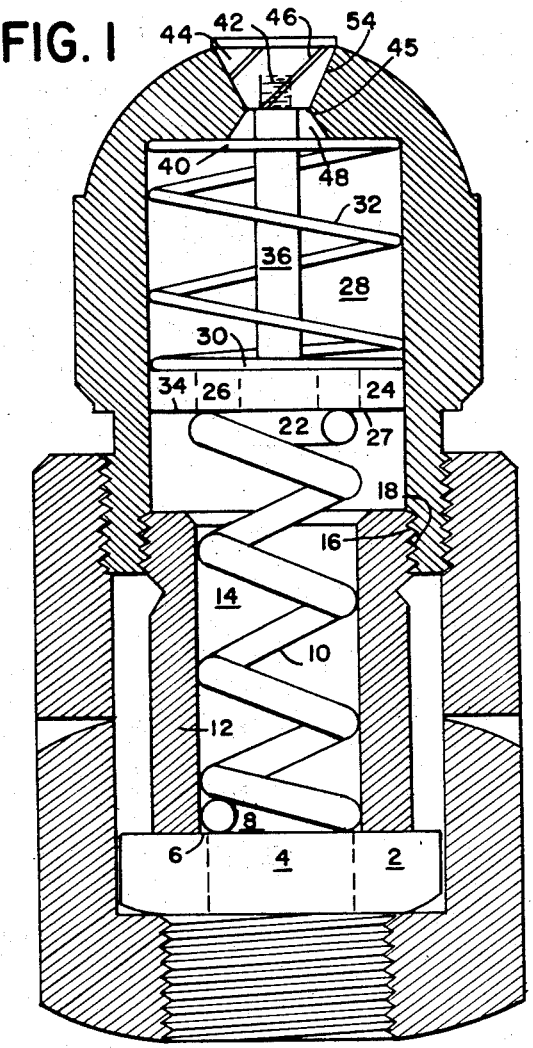
FIGURE 1 is a partial sectional view of one type of temperature responsive nozzle which is the subject of this invention.
Figure 3:
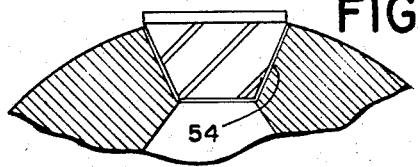
FIGURE 3 is a partial sectional view of nozzle illustrated in FIGURE 1, illustrating the change in the fuel discharge pattern and flow amount due to a temperature increase.

As illustrated in FIGURE 1, fuel feed line generator 102 is mounted to heater support 100. Nozzle 104 is attached to the end of the pipeline, and may comprise one of the embodiments described hereinafter. Support 100 comprises a cylindrical pan, said cover defining hole 108 to permit fuel drippings from nozzle 104 which are not burned to be collected in the pan for storage and eventual re-ejection into the fuel feed line. This minimizes loss of fuel.

Figure 6:
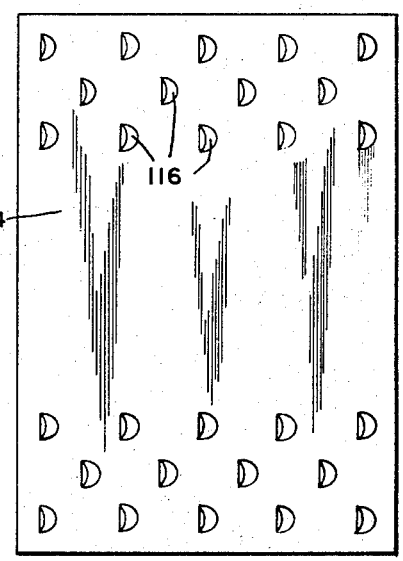
FIGURE 6 is a development of the side surface of the stack, illustrating the venting pattern thereof.

Stack 110 is mounted on cover 106, and is cylindrical in form. It comprises a solid circular cover 112 and a cylindrical side portion 114 defining a plurality of vents 116. The vents are aligned in two series of three rows each, along the top and bottom portions of the stack. As illustrated in FIGURE 6 which is a development of the side portion 114 of the stack, the vents in successive rows of each series are staggered to provide the optimum air intake conditions desired and can be varied according to fuel burned. As will be explained hereinafter, the nozzle utilized in this invention provides a rotating, diverging spray or vortex fuel flow discharge. The vents 116 are designed so that the air intake flow is in the same direction as the rotating vortex fuel discharge.

Figure 5:
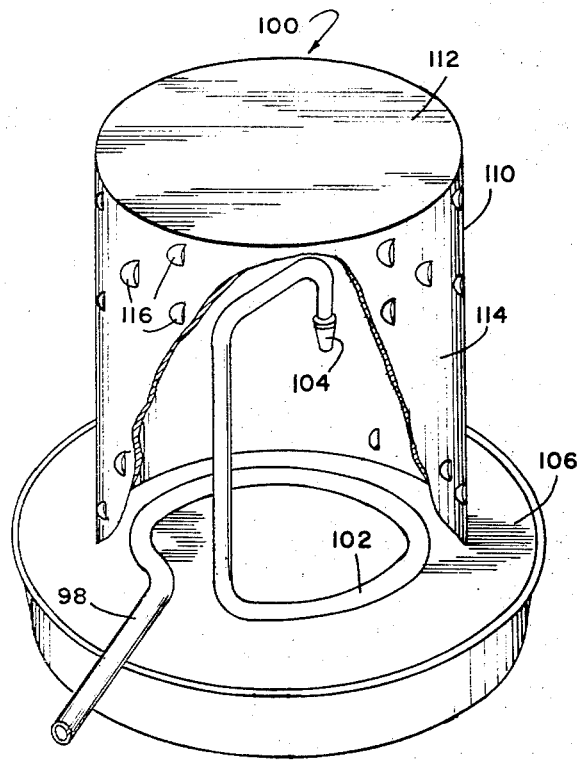
FIGURE 5 is an isometric view of the fuel feed line and nozzle combination mounted in the heater support and stack, which further illustrates the vents provided in this invention, with the stack portion partially cut away.

As illustrated in FIGURE 5, the fuel feed line is bent circularly and positioned around cover 106 to comprise substantially a circular loop of fuel feed line within the stack. This serves to vaporize the fuel in said semi-circular loop before it reaches the nozzle; that is, the fuel is given sufficient time between its entrance into the stack and eventual discharge from the nozzle to be heated to an atomized or gaseous state, when discharged from the nozzle.

Pre-heating of the liquid, (as an example, fuel oil) will mean much greater economy of operation by more complete burning of the fuel. It will also greatly reduce air pollution, caused by the release of unburned fuel into the atmosphere, due to the more complete combustion. Air pollution is, of course, of national concern.

Further, by heating the fuel to the vapor state, thus effecting a liquid-gas conversion, substantially complete combustion of the fuel takes place. This maximizes B.t.u. output and minimizes loss of fuel, since fuel burns most efficiently in the atomized state. Further, because of the complete combustion, smoking to any appreciable extent does not occur; smoking is a phenomena of incomplete combustion, and especially combustion in the liquid state.

The fuel is introduced into pipeline 98 from a reservoir source and is under pressure. A plurality of heaters may be used depending upon the size of the area to be heated and the number of trees or other plants therein, and the various heaters may be either in series, parallel, or in series-parallel.

Initially, the fuel such as fuel oil or diesel fuel, etc. is fed from the reservoir into the pipeline 98 and travels through circular pipeline 102. It is then discharged from nozzle 104, in the liquid state. As the heaters are lit, with a flame for example, the fuel begins to burn. Initially, the fuel burns in the liquid state. However, as burning proceeds, the fuel in the circular loop 102 is heated so that when it is discharged from nozzle 104, it is in the gaseous or vaporized state. At this point, substantially complete combustion occurs, and the continued burning of the fuel maintains the fuel in circular coil 102 to a sufficient temperature such that it is in the vapor state when it is discharged. When it is desired to turn the heat off, it is only necessary to cut off the fuel supply.

As the fuel discharge from the nozzle burns, heat is transferred to the stack 110 and the surrounding area and agricultural produce is heated by convection and radiation from the stack. In this regard, the stack diameter and area are selected so as to optimize the radiation and convection transfer of heat therefrom. This maximizes B.t.u. transfer and increases efficiency. The nozzles described in FIGURES 1-4 may be utilized in conjunction with this invention.

Expansible material in the nozzle construction will adjust the flow as the liquid is heated and expanded by the application of heat.

FIGURE 1 illustrates one embodiment of the nozzle in which base section 2 of nozzle 1 defines hole 4 into which the fuel is ejected from the pipe line (not shown). The upper portion of base 2 comprises a support section 6 to support the bottom terminal coil 8 of spring 10. Extending from base 2 is cylindrical wall 12 defining aperture 14 confining spring 10.

The upper section of wall 12 comprises threads 16 around the outer periphery thereof, which interfit with threads 18 of the inner peripheral wall of nozzle head 20. The top terminal coil 22 of spring 10 is in operative support contact with one surface of support 24. Support 24 defines annulus 26 to convey the fuel from hole 14 into the inner chamber 28 of nozzle head 20. Spring 10 is supported in contacting relationship to support 24 via terminal coil 22 resting against circular flange 27.

The opposite surface of support 24 is in operative contacting support with bottom terminal coil 30 of spring 32; circular flange 34 supports the coil 30. Shaft 36 comprises a center extension of support 24.

Terminal coil 38 at the opposite end of spring 32 is confined to the inner chamber 28 of nozzle head 20 by portion 38 of the nozzle head. The opposite end of shaft 36 is threaded to interfit with female threads 42 of the nozzle discharge head 44. The nozzle discharge head comprises a diverging truncated conical member 44 with channels or slots 46 and 48 being defined on its surface. Corresponding slots (50 and 52 not shown) are provided on the other side of the nozzle discharge head 44. The four channels comprise similar helical convolutes around conical discharge head 44, the starting positions of the channels being equally distant around circular portion 45 of the nozzle discharge head 44. Thus, it produces a rotating, conically diverging spray of fuel to be discharged from channels 46, 48, 20 and 52, as illustrated.

In operation, the fuel is fed from the pipe line (not shown) to hole 4, and then via holes 14 and 26 in the inner chamber 28 of nozzle head 20, into well 46. It is then discharged via channels 46, 48, 50, and 52, to form the discharge pattern illustrated. When the fuel is at its normal unheated temperature, spring 32 is of sufficient strength relative to spring 10 to counteract the force of spring 10 and maintain secure and sealing contact between nozzle discharge head 44 and complementary truncated portion 54 of nozzle head 20.

However, as the temperature of the fuel increases, by preheating before ejection into the nozzle, and by burning the fuel being discharged from the nozzle, springs 10 and 32 will expand. Since spring 10 has a higher coefficient of expansion relative to spring 32, it will expand more rapidly and will therefore exert a compressive force on spring 32 via support 24 to withdraw nozzle discharge head 44 out of sealing contacting relation with section 54 of the nozzle head 20. This will create a circular slit or channel 56 through which additional fuel is discharged.

Figure 2:
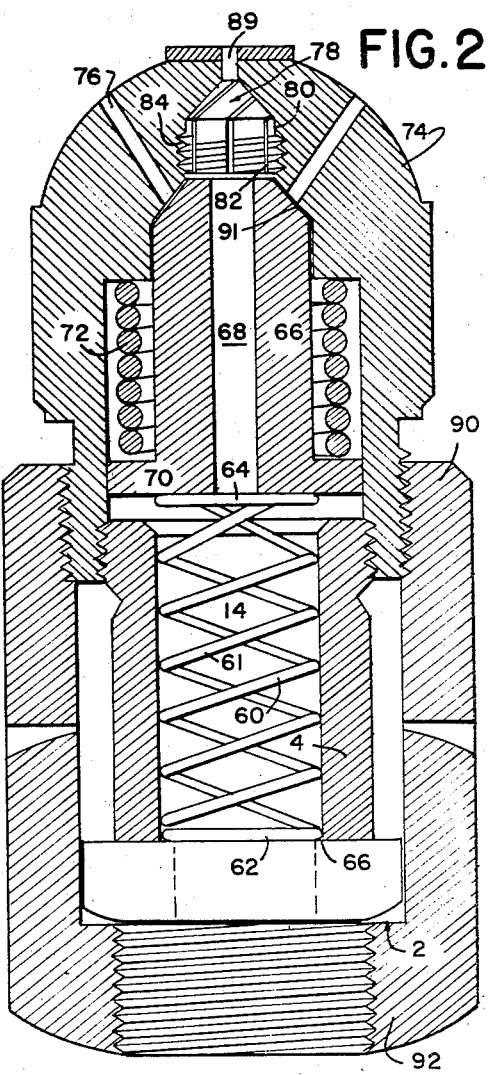
FIGURE 2 is a sectional view of another type of temperature responsive nozzle in which the valve and spring construction is varied from that shown in FIGURE 1.
Figure 4:
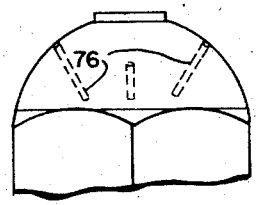
FIGURE 4 is a partial elevation of FIGURE 2 illustrating the additional fuel channel created as the temperature of the fluid increases.

Thus, the pattern and amount of fuel discharged from the nozzle will be that illustrated in FIGURE 2. The width of the circular channel 56 will vary directly as the temperature of the fuel since spring 10 expands directly proportionate to the temperature. As the temperature of the fuel decreases, spring 10 will compress more rapidly than spring 32, thereby withdrawing the nozzle discharge head 44 back into contacting relation with portion 54 of the nozzle head 20. This will close slits or channels 56, and cut off the flow of fuel therethrough.

FIGURE 2 illustrates another embodiment of the temperature responsive nozzle in which dual springs 60 and 61 are wound in opposite helixes. The bottom terminal coils 62 of springs 60 and 61 are supported by circular flange 6 and the spring is confined to the inner hole 14 of base 2. The opposite ends of the terminal coils 64 are in operative support contact with support 66 which forms a cylindrical section defining annulus 68 and flange 70. Upper spring 72 is supported on flange 70 and is wound around circular support 66.

The nozzle head 74 comprises a substantially spherical top surface and defines a plurality of equally spaced annuli 76 in the same circular orbit (the latter two not being shown) through discharge head 74. Nozzle discharge head 78 comprises a cylindrical portion 80 defining channels 82, the outer periphery of cylindrical section 80 having threads 84 to interfit with female threads 86 of nozzle head 74. Annuli 76 could comprise helical convolutes of constantly decreasing diameter if desired.

Thus, fuel is fed through hole 4 to hole 14 through annulus 68 to channels 82 and finally via helical channels 86 through the annulus 89, and are finally discharged in the form of a rotating vortex as illustrated in FIGURE 2. The vortex tends to spread out in a twisting motion when discharged from the annulus.

As the temperature of the fuel increases, thereby causing an expansion of springs 60 and 61, as well as 72, with spring 72 having a greater coefficient of expansion than springs 60 and 61, support 66 will be forced towards base 2 thereby forming slot 91 (shown in dotted lines in FIGURE 2). The fuel will then be conveyed via annulus 68 through the slot, and finally out of channels 78. This will change the fuel flow pattern, as well as the amount of fuel being discharged, as the temperature varies. The amount of fuel discharged through channels 76 will vary directly as the temperature of the fuel, since the diameter of slot 91 will also vary directly as the temperature of the fuel.

As the temperature of the fuel decreases, the springs will again compress and will force support 66 into closing contact with nozzle discharge head 74, closing slot 91.

The outer periphery of the nozzle head may comprise threads to which couple 90 is fitted. Couple 90 comprises female fitted portion 92 for coupling of the nozzle to the fuel feed line (not shown).

When utilizing liquids, preheating the fuel to the gaseous state as it is discharged from the nozzle results in better and more complete combustion. However, it is also possible to discharge other types of fluids, such as gases. Also, the springs can be replaced with tubular metal material, provided the realtive coefficients of expansion are as disclosed for the springs.

Having thus described my invention, I hereby claim the following:

1. A method for heating a predetermined portion of the atmosphere, comprising:

(A) feeding liquid fuel to a heating device;

(B) discharging the fuel in a predetermined pattern from a nozzle;

(C) combusting the discharged fuel thereby heating the surrounding area;

(D) the combusting also preheating the liquid fuel to the gaseous state before it is discharged from the nozzle, thereby effecting substantially complete combustion thereafter;

(E) varying the predetermined pattern automatically as the fuel temperature changes;

(F) discharging the fuel in a rotating diverging vortex pattern initially;

(G) changing said pattern to include additional diverging circular fuel flow therearound when a predetermined temperature is reached, the diameter of said additional circular flow varying directly as the temperature of the fuel.

2. An atmospheric heating device which comprises:

(A) a base support;

(B) a cylindrical stack mounted on said support, said stack being foraminous;

(C) a liquid fuel feed line mounted upon said support and projecting upwardly within the stack, one portion of the line being looped to define a fuel pre-heating zone and an extension portion projecting upwardly therefrom and being bent downwardly at its terminal end;

(D) a discharge nozzle, on the terminal end of the line, the fuel discharged therefrom being emitted toward the support and loop; the input of said line being connected to a source of fuel, whereby combustion of said liquid fuel initially discharged from the nozzle creates a vaporizing zone about said fuel line and within the stack to convert the additional liquid fuel to the gaseous state in the line, whereby it is substantially completely combusted when discharged, said discharge nozzle comprising;

(E) a discharge head through which said fuel is discharged from said nozzle, said head defining plural channels for discharging said fuel in a pre-determined flow pattern;

(F) said nozzle containing temperature responsive means connected to the head to vary the configuration of the head channels whereby to vary the flow pattern as the combustion temperature of said fuel may vary, said temperature responsive means comprising;

(G) first resilient means which expands directly as the temperature of the fuel, said expanded resilient means being operative to open an additional channel for discharging said fuel.

3. The atmospheric heating device as described in claim 2, wherein said nozzle comprises a second resilient means to counteract said first resilient means until a predetermined fuel temperature is reached, whereby said additional channel for discharging said fuel is opened.

4. The atmospheric heating device as described in claim 3, wherein said first and second resilient means are disposed in the chamber of said nozzle, and are separated by a second support, the terminal coil on one end of each of said resilient means being operatively connected to said support.

5. The atmospheric heating system as described in claim 4 which further comprises a nozzle housing, said nozzle being connected to said housing, said nozzle defining a plurality of channels forming helical convolutes on the surface thereof, and connected to a common discharge area of said nozzle housing, whereby a twisting vortex spray forms said predetermined pattern.

6. The atmospheric heating system as described in claim 4 wherein said nozzle defines a plurality of diverging annuli equally spaced in an axis to form said additional channel, said additional channel being blocked by said support until said predetermined temperature is reached.

References Cited

UNITED STATES PATENTS

| | | | |
|---|---|---|---|
| 2,016,002 | 10/1935 | Fugit | 126—59.5 |
| 2,260,548 | 10/1941 | Veghte | 158—66 |
| 2,508,788 | 5/1950 | Hallinan | 239—75 |
| 2,513,720 | 7/1950 | Hallinan | 239—75 |
| 3,320,775 | 5/1967 | Wright. | |

FOREIGN PATENTS 355,645  8/1961  Switzerland.

OTHER REFERENCES

Meyer; German Application No. 1,151,403, pub. July 11, 1963, class 126/59.5.

CHARLES J. MYHRE, *Primary Examiner.*

U.S. Cl. X.R.

431—242